United States Patent Office 3,024,253
Patented Mar. 6, 1962

3,024,253
PROCESS FOR OXIDIZING STYRENE TO STYRENE OXIDE
Alfred Saffer, Bayside, N.Y., and Robert S. Barker, Plainfield, N.J., assignors, by mesne assignments, to Scientific Design Company, Inc., a corporation of Delaware
No Drawing. Filed Sept. 14, 1956, Ser. No. 609,795
2 Claims. (Cl. 260—348.5)

This application is concerned with oxidation processes. More particularly it is concerned with a liquid phase oxidation process catalyzed by the conjoint presence of a metal and bromine. The invention is directed to the production of oxirane compounds, particularly to the epoxidation of alkenyl aromatics, and more particularly to the epoxidation of vinyl aromatics.

The production of oxirane compounds is known. However, it has been discovered as a feature of this invention that utilization of a metal and bromine as catalyst in liquid phase oxidation makes possible very high reaction rates while at the same time very high oxygen absorption efficiencies are obtained.

In general, the process of this invention is concerned with the oxidation of alkenylaromatics, that is, a compound having an aromatic nucleus to which is attached an alkenyl group. Illustrative of the aromatic nuclei are such as benzene, naphthalene, phenanthrene, and such hetero-aromatic nuclei as pyridine, furane, thiophene, and the like; particularly hetero-aromatic nuclei containing oxygen and nitrogen hetero-atoms. Illustrative of the alkenyl groups are radicals such as vinyl, propenyl, butenyl, pentanyl, hexenyl, heptenyl, octenyl, nonenyl and higher alkenyls.

Illustrative of the compounds which can be utilized in the process of this invention are such as styrene, vinyl naphthalene, vinyl diphenyl, vinyl pyridine, vinyl piperidine, vinyl phenol, chlorostyrene, bromostyrene, nitrostyrene, aminostyrene, propenylbenzene, butenylnaphthalene, butenyl biphenyl, vinyl diphenyl ether, propenylpyridine, and the like.

It will be understood that the aromatic nuclei may contain substituents other than the alkenyl group.

In general, the invention contemplates oxidation of an alkenylaromatic compound in the conjoint presence of a metal and bromine as a catalyst in which molecular oxygen, desirably air, is passed through the compound which is maintained substantially in the liquid phase. Although such use is not essential, there can be utilized in the reaction mixture a solvent or diluent, as the case may be. Desirably, such a solvent or diluent can be a non-acid organic compound, for example, any aromatic or aliphatic compound boiling in the range of from approximately 50 to 450° C. at atmospheric pressure and suitable under the reaction conditions. These may be typified by halogenated, e.g., chlorinated polyphenyls, especially chlorinated biphenyls boiling in the range of 275 to 430° C. and liquid at about 25° C., biphenyl, diphenyl ether, and naphthalene. Mixtures thereof may be used.

Also there can be utilized a mono-carboxylic acid having from 1 to 8 carbon atoms in the molecule. These acids are illustrated, for example, by such as acetic, propionic, butyric, valeric, iso-butyric, phenyl acetic, beta-ethoxy acetic, benzoic, and the like acids.

As used herein parts and percentages are by weight, unless otherwise specified.

Example 1

There is utilized a reactor made of 25 mm. O.D. Pyrex tubing packed with 3 mm. diameter glass beads and connected to a suitable condenser. The reactor is 36 inches long and is surrounded by a refluxing toluene bath which permits an operating temperature of 110° C. Styrene, containing 0.01% of hydroquinone and 0.1% manganese bromide is added to the top of the reactor at the rate of 60 ml. per hour. There is flowed countercurrently oxygen at the rate of 50 liters per hour. Vent gases from the top of the reactor are passed through the condenser before being vented to the atmosphere and reaction constituents returned to the tube. The liquid effluent removed from the bottom of the reactor is fractionated at 0.1 mm. to recover unreacted styrene and a fraction containing 90% of styrene oxide.

Example 2

Example 1 is repeated, substituting for the manganese bromide there utilized an equal amount of cobalt bromide. Substantially similar results are obtained.

Similarly, there can be substituted for the styrene utilized in the foregoing examples other alkenylaromatics to yield analogous oxirane compounds. Thus, utilizing vinyl naphthalene there is obtained epoxy naphthalene; utilizing vinyl pyridine there is obtained epoxy pyridine; and utilizing 2-butenylbenzene there is obtained 2–3 epoxy-butenylbenzene. Analogously, utilizing as starting materials such compounds as vinyl-diphenyl, chlorostyrene, bromostyrene, propenylbenzene and vinyl-diphenyl ether there are obtained respectively epoxy diphenyl, epoxy chlorobenzene, epoxy bromobenzene, epoxy propylbenzene and epoxy diphenyl ether. Further, it will be realized that mixtures of alkenylaromatics can be epoxidized utilizing the process of this invention.

While the apparatus described above had glass beads for packing, other types of packing may be utilized. For example, conventional packing material such as Raschig rings can be used. The catalyst may be incorporated in the packing. Although it is not necessary to utilize packing in the process of the invention, such use is preferred.

Desirable results are obtained with various modifications of the foregoing examples. Thus, the process can be carried out in a batch, intermittent, or continuous manner.

In general, the reaction can be carried out utilizing a metal and bromine as the catalyst. Particularly useful are the heavy metals shown in the "Periodic Chart of Elements" on pages 56 and 57 of the "Handbook of Chemistry," 8th Edition, published by Handbook Publishers, Inc., Sandusky, Ohio, 1952. Of the heavy metal group those members having an atomic number not greater than 54 have been found suitable. However, the metals outside the heavy metal group may also be employed. Excellent results are obtained by the utilization of a metal having an atomic number of 23–28 inclusive. Particularly excellent results are obtained with a metal of the group consisting of manganese, cobalt, nickel, chromium, vanadium, molybdenum, tungsten, tin and cerium. The metal may be either as a single metal or as a combination of such metals. The metal may be added in elemental, combined or ionic form and similarly, the bromine may be added in elemental, combined or ionic form. As a source of bromine, ammonium bromide or other metal compounds soluble in the reaction medium may be employed. Satisfactory results are obtained, for example, with potassium bromate, tetra-bromoethane and benzyl bromide.

The metal may be supplied in the form of metal salts. For example, the metal manganese may be supplied as the manganese salt of a lower aliphatic carboxylic acid, such as manganese acetate, in the form of an organic complex, of which mention may be made of the acetylacetonate, the 8-hydroxy quinolinate and the ethylene diamine tetra-acetate, as well as manganese salts such as the borates, halides and nitrates which are also efficacious.

In general, the catalysts are utilized in amounts in the range of about 0.1 to 10% based on the alkenylaromatic. Excellent results are obtained utilizing catalysts in the range of 0.1 to 5% and it is preferred to utilize 0.1 to 1.0% based on the alkenylaromatic.

The reaction temperature should be sufficiently high so that the desired oxidation reaction occurs, and yet not so high as to cause rupture of the oxirane ring or undesirable charring or formation of tars. Thus, temperatures in the range of about 50 to 115° C. may be utilized, desirably in the range of 60 to 115° C., and preferably in the range of 90 to 110° C.

As stated above there may be utilized as a solvent or diluent for the alkenyl aromatic a non-acid organic compound.

The mono-carboxylic acids which may be utilized as a solvent or diluent are illustrated, for example, by such as acetic, propionic, butyric, valeric, iso-butyric, phenylacetic, beta-ethoxy-acetic, benzoic, and the like acids. Preferably, these acids do not contain hydrogen atoms attached to a tertiary carbon atom. These acids can be utilized in amounts up to about 20 parts per part of alkenylaromatic. While amounts in excess of this can be utilized such use is not desirable for economic reasons. Good results are obtained utilizing the mono-carboxylic acids in amounts of about ½ to 5 parts per part alkenyl-aromatic and it is preferred to utilize 1–3 parts per part of alkenylaromatic.

As has been stated above, the pressure should be sufficient to maintain the alkenylaromatic in the liquid phase. Generally, the pressure is in the range of 100 to 1500 p.s.i.g. and preferably is at least slightly above the boiling pressure of any solvent or diluent at the reaction temperature.

The oxygen used may be in the form of substantially 100% oxygen gas or in the form of gaseous mixtures containing lower concentrations of oxygen, e.g., down to about 20% such as in air. Where the gaseous mixture contains a relatively lower concentration of oxygen, a correspondingly higher pressure or flow rate of the gas should be used, in order that a sufficient amount (or partial pressure) of oxygen is actually fed into the reaction mixture.

While the foregoing examples have illustrated the utilization of manganese and cobalt as in the form of their bromides as the catalyst it will be realized that substitution of other metals, as above described, in the foregoing examples yield similar results. For example, as a catalyst there may be utilized a combination of manganese acetate and ammonium bromide; powdered manganese metal and ammonium bromide; nickel bromide; cobalt acetate and ammonium bromide; manganese acetyl acetonate and ammonium bromide; manganese 8-hydroxy quinolinate and ammonium bromide; a manganese complex of ethylene diamine tetra-acetic acid and ammonium bromide; manganese borate and ammonium bromide; manganese chloride and ammonium bromide; manganese acetate and potassium bromate; manganese acetate and free bromine; manganese acid and tetra-bromoethane; and manganese acetate and benzyl bromide. Similarly, there may be utilized as a catalyst a material resulting from an admixture of 1 part cerium hydroxide, 1 part ammonium bromide and 50 parts of 20% hydrobromic acid, which mixture is evaporated to dryness. Additionally, tungstic acid, ammonium molybdenate and Raney nickel alloy may be treated similarly to cerium hydroxide as just described to yield an effective catalyst. Amongst other metals which may be utilized conjointly with bromine to produce oxygenated compounds according to the process of this invention are beryllium, aluminum, bismuth, cadmium, iron, palladium, lead, neodymium and copper.

The oxygenated compounds produced according to the process of this invention find use in a variety of chemical reactions.

The process of this invention generally is carried out so as to provide a contact time of the alkenylaromatic with molecular oxygen in the presence of a catalyst for a time in the range of approximately 0.1 to 50 hours. Excellent results are obtained in the time range of from about ½ hour to 10 hours and it is preferred to operate in the range of 1–4 hours.

In view of the foregoing discussions, variations and modifications of the invention will be apparent to one skilled in the art and it is intended to include within the invention all such variations and modifications except as do not come within the scope of the appended claims.

We claim:

1. An epoxidation process to produce styrene oxide comprising contacting styrene with molecular oxygen in the presence of manganese bromide catalyst at a temperature in the range of about 50 to 115° C. and at a pressure such that a liquid phase is maintained.

2. An epoxidation process to produce styrene oxide comprising contacting styrene with molecular oxygen in the presence of cobalt bromide catalyst at a temperature in the raneg of about 50 to 115° C. and at a pressure such that a liquid phase is maintained.

References Cited in the file of this patent

UNITED STATES PATENTS

| | | |
|---|---|---|
| 2,197,101 | Eaglesfield | Apr. 16, 1940 |
| 2,650,927 | Gasson | Sept. 1, 1953 |

FOREIGN PATENTS

| | | |
|---|---|---|
| 494,759 | Belgium | Apr. 15, 1950 |